United States Patent [19]

Tanaka et al.

[11] 3,716,677

[45] Feb. 13, 1973

[54] MULTI-CHANNEL MAGNETIC HEAD

[75] Inventors: Takashi Tanaka; Yukihiro Yanagiuchi, both of Osaka, Japan

[73] Assignee: Matsushita Electric Industrial Co., Ltd., Kadoma, Osaka, Japan

[22] Filed: June 5, 1970

[21] Appl. No.: 43,715

[52] U.S. Cl...179/100.2 C, 340/174.1 F, 346/74 MC

[51] Int. Cl..........G11b 5/16, G11b 5/20, G11b 5/28

[58] Field of Search..........179/100.2 C; 340/174.1 F; 346/74 MC

[56] References Cited

UNITED STATES PATENTS

| | | | |
|---|---|---|---|
| 3,064,333 | 11/1962 | Kristiansen et al. | 179/100.2 C |
| 3,549,825 | 12/1970 | Trimble | 179/100.2 C |
| 3,166,740 | 1/1965 | Brehe | 340/174.1 F |
| 3,501,756 | 3/1970 | Woods et al. | 179/100.2 C |
| 3,185,971 | 5/1965 | Brette et al. | 179/100.2 C |

*Primary Examiner*—Howard W. Britton
*Attorney*—Wenderoth, Lind & Ponack

[57] ABSTRACT

A multi-channel magnetic head composed of a stack of a plurality of elementary head units. Each unit has a substantially D-shaped magnetic core having a magnetic gap. A winding is wound on said core, and a support plate is provided on which said D-shaped core is positioned. The support plate has at least one recess in which said winding is positioned. The support plate is a laminated structure having a magnetic sheet and non-magnetic sheets. The plurality of elementary head units are stacked with the gaps of the elementary head units aligned in a single straight line.

7 Claims, 12 Drawing Figures

INVENTORS
TAKAHASHI TANAKA
YUKIHIRO YANAGIUCHI

BY Wenderoth, Lind & Ponack
ATTORNEYS

INVENTORS
TAKAHASHI TANAKA
YUKIHIRO YANAGIUCHI

BY Wenderoth, Lind & Ponack
ATTORNEYS

INVENTORS
TAKAHASHI TANAKA
YUKIHIRO YANAGIUCHI
BY Wenderoth, Lind & Ponack
ATTORNEYS

MULTI-CHANNEL MAGNETIC HEAD

This invention relates to a multi-channel magnetic head, especially to such a head for recording and reproducing from a tape with narrow tracks and high track density.

A conventional multi-channel magnetic head is made as follows. C-shaped core members or C-shaped and I-shaped core members with a winding wound on them are alternately stacked with a suitable space between adjacent core members in order to make a half of a multi-channel magnetic head. Then the two halves are placed in face to face relationship with a spacer between them. The core members in one half match up with corresponding core members in the other half to make ring type head cores for the elementary heads.

In such a construction method, it is difficult to match up the core members in one half exactly with corresponding core members in the other half. When the tracks on the tapes for use with the elementary heads are narrow, the mismatching of core members is very serious.

The spacing of individual heads in a conventional multi-channel magnetic head is limited by the space required for the windings and the cross-talk between the elementary heads. However, recent developments in information processing by the use of tapes has increasingly required the higher track density on the tapes and better crosstalk characteristics of the heads.

An object of the present invention is to provide a multi-channel magnetic head in which the core members are matched up exactly with corresponding core members, even if the core members are thin.

Another object of the invention is to provide a multi-channel magnetic head which causes very little cross talk between adjacent channels and can be used for a tape with a high track density.

These objects are achieved by a multi-channel magnetic head according to the present invention which is composed of a stack of a plurality of elementary head units, and each elementary head unit comprises a substantially D-shaped magnetic core having a magnetic gap, a winding wound on said core, and a support plate on which said D-shaped core is positioned and having at least one recess in which said winding is positioned. The support plate is a laminated structure having a magnetic sheet and non-magnetic sheets, and said plurality of elementary head units being stacked with the gaps of said elementary head units aligned in a single straight line with the windings extending into the recesses in said support plates.

These and other objects of the invention will be apparent from the following detailed description taken together with the accompanying drawings, in which.

Figure 1:
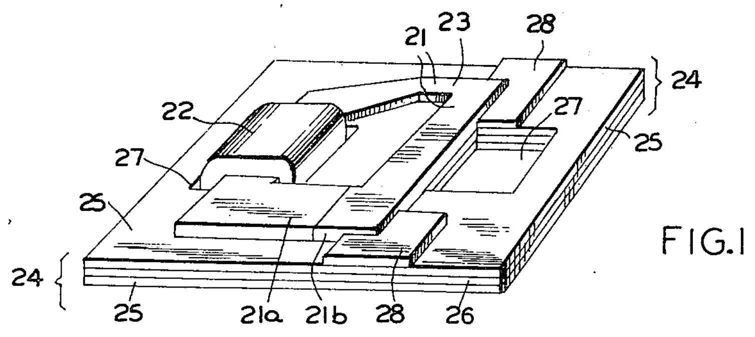
FIG. 1 is a perspective view of an elementary head unit of one embodiment of the multi-channel magnetic head according to the present invention.

Referring to FIG. 1, reference character 21 designates a D-shaped magnetic core. The D-shaped magnetic core 21 has a C-shaped core member **21*a* combined with an I-shaped core member 21*b* at one end through a non-magnetic spacer 23, to define a magnetic gap and directly joined at the other end. A winding 22 is wound on the C-shaped core member 21*a***.

The D-shaped magnetic core 21 with the winding 22 is mounted on the flat surface of a support plate 24 having two recesses 27 and 27′ formed therein. The support plate 24 is a laminated structure having a magnetic sheet 26 between non-magnetic sheets 25. The winding 22 extends into one of said two recesses 27 and 27′, for example recess 27. The other recess, for example the recess 27′, has the winding of an adjacent unit extending into it when a plurality of units are stacked together in a manner described below. L-shaped plates 28 are attached to the support plate 24 to fix the D-shaped core 21 accurately in the desired position on the support plate 24.

Figure 2:
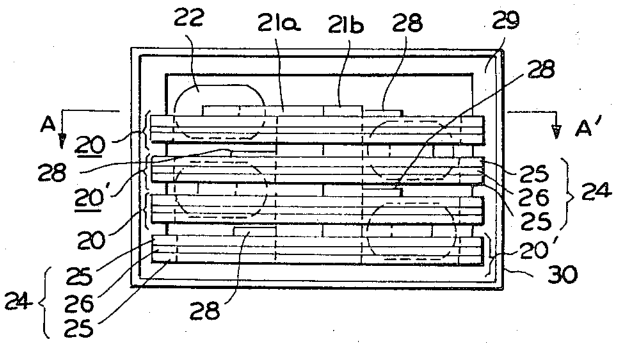
FIG. 2 is an elevation view of one embodiment of the multi-channel magnetic head according to the present invention.
Figure 3:
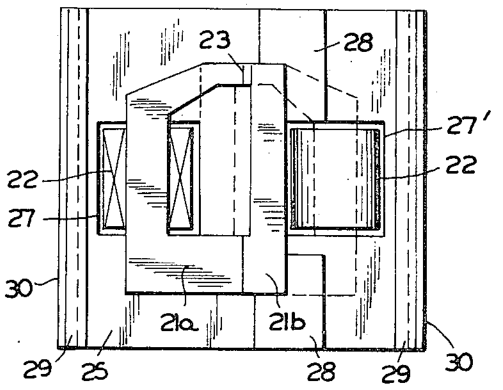
FIG. 3 is a cross-sectional plan view on line A—A′ of FIG. 2.

A plurality of units 20 which are the same as shown in FIG. 1 and a plurality of other units 20 which are in mirror image relationship with the units 20 are stacked alternately to form a multi-channel magnetic head as shown in FIGS. 2 and 3. In the multi-channel magnetic head the gaps of all of the units are aligned in a single straight line. The units are in a staggered relationship in which adjacent units are offset and alternate units are aligned. The multi-channel magnetic head is mounted in a frame 29 to ensure the alignment of the plurality of the magnetic gaps. The frame may be further enclosed in a shield case 30 to protect the multi-channel magnetic head from undesired external fields. Each of the plurality of windings is connected to the conventional terminals (not shown) by any available and suitable means.

Said D-shaped magnetic core and said magnetic sheet of the support plate may be composed of any suitable and avail-able magnetic materials such as permalloy. Said non-magnetic spacer and said non-magnetic sheets of the support plate may be composed of any suitable and available non-magnetic material such as BeCu.

Said C-shaped magnetic core member and said I-shaped core member match up exactly with each other, even when said core members are thin, because said two core members are positioned on one flat surface of said support plate. Therefore, the multi-channel magnetic head shown in FIGS. 2 and 3 can be used for tapes having narrower tracks and a higher track density than can the conventional multi-channel magnetic head. Said recesses on the support plate are also useful for making the head suitable for tapes of higher track density. Moreover, in said multi-channel magnetic head there is very little cross-talk between adjacent channels due to the following reasons: (1) each of said D-shaped cores is offset from the D-shaped cores in the adjacent units, and (2) said support plate is a laminated structure having a magnetic sheet and non-magnetic sheets.

Figure 4:
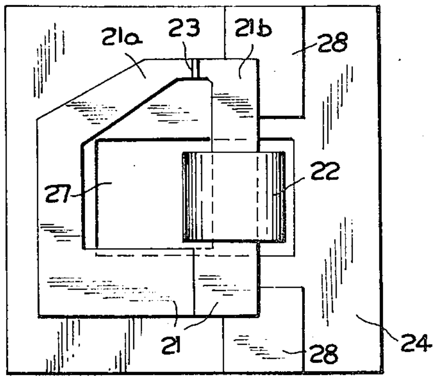
FIG. 4 is a plan view of another embodiment of the elementary head unit for the multi-channel magnetic head according to the present invention.
Figure 5:
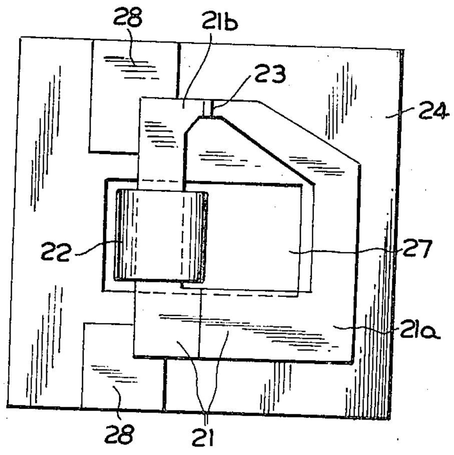
FIG. 5 is a plan view of the unit which is in mirror image relationship with the unit shown in FIG. 4.

An elementary head unit for another embodiment is shown in FIG. 4. D-shaped core 21 has a C-shaped core member **21*a* combined at one end with an I-shaped core member 21*b* through a non-magnetic spacer 23 to form a magnetic gap, and is directly joined at the other end. A winding 22 is wound on the I-shaped core member 21*b*. The D-shaped core with the winding 22 is mounted on a support plate 24 which has only one recess 27 therein. The winding 22 is placed at a position to the right of the center of the recess 27, as seen in FIG. 4. Referring to FIG. 5, wherein similar references designate components similar to those of FIG. 4, in a mirror image unit, the winding unit 22 is placed at a position to the left of the center of the recess 27**.

A plurality of units shown in FIG. 4 and a plurality of units shown in FIG. 5 are stacked together alternately to form a multi-channel magnetic head in a manner similar to that of FIGS. 2 and 3. The windings from each unit project into the single recess in adjacent support plates.

Figure 6:
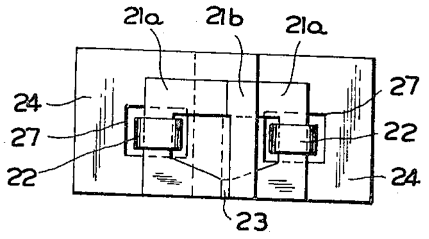
FIGS. 6 and 7 are a plan view and a front elevation view, respectively, of another embodiment of the multi-channel magnetic head according to the present invention.
Figure 7:
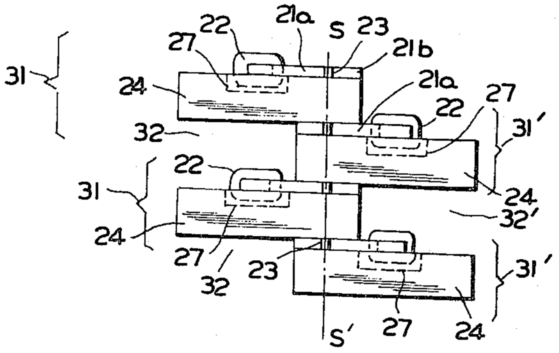

Referring to FIGS. 6 and 7, which show another embodiment, four elementary head units 31 and 31' are stacked together in a staggered arrangement to form a multi-channel magnetic head. In this staggered arrangement, four magnetic gaps 23 are aligned in a single straight line S—S'.

Each elementary head unit 31 or 31' comprises a D-shaped magnetic core 21 having a C-shaped core member 21a combined with an I-shaped core member **21*b* in the same manner as described above for the earlier described embodiments. A winding 22 is wound on the C-shaped core member 21*a*. The D-shaped magnetic core 21 with the winding 22 is positioned on a support plate 24 having one recess 27 formed therein. The elementary head units 31 and 31'** are in mirror image relationship with each other.

Referring again to FIG. 7, each pair of adjacent units 31 and 31' are offset from each other and alternative units 31 and 31 or 31' and 31' are aligned with each other and have an open space 32 or 32' between them.

Figure 8:
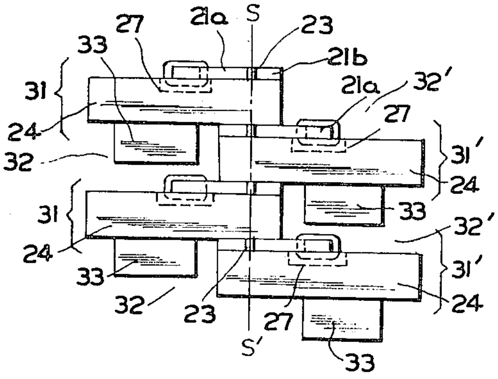
FIG. 8 is a front elevation view of another embodiment.

Referring to FIG. 8, wherein similar reference characters designate components similar to those of FIGS. 6 and 7, electrical parts 33 other than the parts of said magnetic head are accommodated in the open spaces 32 and 32'. The electrical parts 33 can be a transformer and/or an amplifier in a form of integrated circuit which are coupled to the respective windings 22. A combined transformer can reduce the number of turns of the windings as well as the cross-talk.

Figure 9:
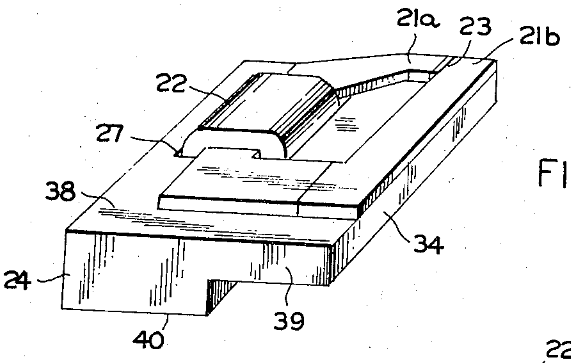
FIG. 9 is a perspective view of another embodiment of an elementary head unit.
Figures 10, 12:
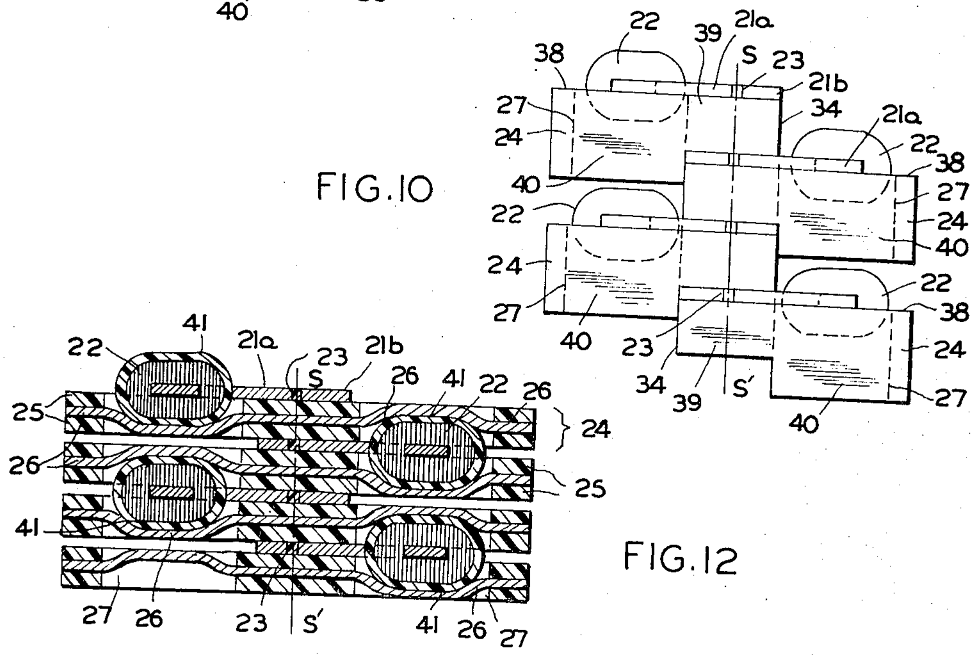
FIG. 10 is a front elevation view of another embodiment using the head units shown in FIG. 9.
FIG. 12 is a cross-sectional elevation view taken on line B—B′ of FIG. 11.

In the embodiment shown in FIGS. 9 and 10, wherein similar reference characters designate components similar to those of the foregoing figures, the head unit a D-shaped core 21 with a winding 22 is mounted on flat upper surface 38 of support plate 24 having a recess 27 formed thereon. The winding 22 is positioned in the recess 27. The support plate 24 has a thinner portion 39 and a thicker portion 40, and the recess 27 is formed in the thicker portion 40 of the support plate 24. A plurality of such elementary head units and units which are mirror image units thereof are stacked in a staggered arrangement to form a multi-channel magnetic head, as shown in FIG. 10. The thinner portion 39 of each said support plate 24 overlies the next lower support plate 24, and the thicker portion 40 overlaps an edge 34 of the next lower support plate 24, i.e., extends below the upper surface 38 of the next lower support plate 24 and abuts the edge 34 of said next lower support plate 24. Such a construction is effective for ensuring alignment of the plurality of gaps 23 in one straight line S—S'.

Figure 11:
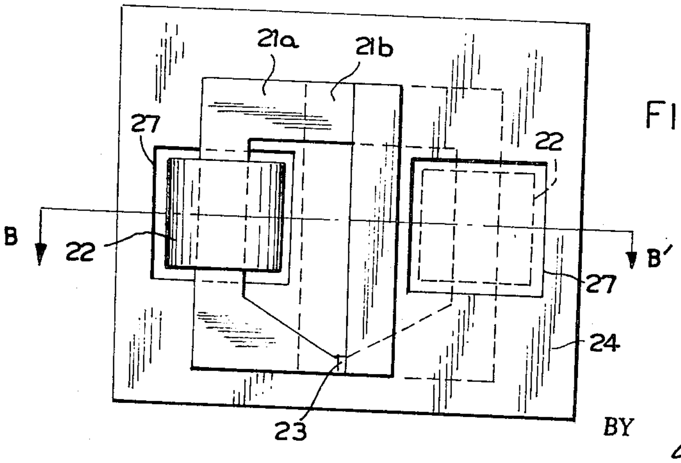
FIG. 11 is a plan view of another embodiment of the multi-channel magnetic head according to the present invention.

In the embodiment shown in FIGS. 11 and 12, wherein similar reference characters designate components similar to those of foregoing figures, each of the elementary head units comprises a D-shaped core 21 having a C-shaped core member **21*a* combined with an I-shaped core member 21*b* through a non-magnetic spacer 23 to form a magnetic gap in the same manner as the previous embodiments. A winding 22 is wound on the C-shaped core member 21*a*. The D-shaped core 21 having the winding 22 thereon is positioned on a support plate 24. The support plate 24 is a laminated structure having a magnetic sheet 26 between non-magnetic sheets 25. The non-magnetic sheets 25 of the support plate 24 each have two recesses 27 therein aligned with corresponding recesses in the other non-magnetic sheet. The magnetic sheet 26 has no recesses. The winding 22 has a thin layer 41 of non-magnetic material, such as paper or plastics covering said winding 22. A plurality of such elementary head units are stacked with mirror image head units with the gaps 23 of said elementary head units aligned in a single straight line S—S' to form a multi-channel magnetic head, as shown in FIG. 12. The winding 22 extends into one recess 27 in its own support plate and bends said magnetic sheet 26 into the one recess 27 in the non-magnetic sheet 25, which is on the opposite side of said head unit from said D-shaped core 21. On the other hand, a winding 22 from an adjacent head unit in said stack extends into the other recesses 27 in the support plate and bends said magnetic sheet 26 into the other recess 27 in the non-magnetic sheet 25 which is on the same side of said head unit as said D-shaped core 21**.

Said magnetic sheet may be composed of any suitable and available flexible magnetic material, such as permalloy. Said non-magnetic sheets may be composed of any suitable and available non-magnetic material such as BeCu.

The multi-channel magnetic head of FIGS. 11 and 12 is effective for shielding a plurality of elementary head units from each other even when the channel density is very high. Therefore, the cross-talk can be greatly reduced.

What is claimed is:

1. A multi-channel magnetic head composed of a stack of a plurality of elementary head units, each unit comprising a thin planar substantially D-shaped magnetic core having two portions which when placed together define an opening, with one end of the one portion magnetically joined to one end of the other portion, and a magnetic gap between the other end of said one portion and the other end of said other portion, a winding wound on one of said core portions, and a support plate having a flat surface on which said D-shaped core is supported and having at least one recess across which the portion of said core having said winding thereon extends and in which said winding is positioned, said support plate being a laminated structure having a magnetic sheet and at least one non-magnetic sheet, said plurality of elementary head units being stacked with the gaps of said elementary head units aligned in a single straight line.

2. A multi-channel magnetic head as claimed in claim 1, wherein each of said support plates has said winding and a winding of at least one of the adjacent units in said recess thereof.

3. A multi-channel magnetic head as claimed in claim 1 wherein each of said support plates has two recesses therein, the winding of the magnetic core thereon being in one recess and a winding from an adjacent core extending into the other recess.

4. A multi-channel magnetic head as claimed in claim 1, wherein said plurality of elementary head units are stacked in a staggered arrangement in which each pair of adjacent units are offset from each other and alternative units are aligned with each other and have an open space between them, whereby said space can be used for accommodating electrical parts other than the parts of said magnetic head.

5. A multi-channel magnetic head as claimed in claim 4 wherein each said support plate has a thinner portion overlaying the next lower support plate, and a thicker portion extending below the upper surface of the next lower support plate and abutting an edge of said next lower support plate.

6. A multi-channel magnetic head composed of a stack of a plurality of elementary head units, each unit comprising a thin planar substantially D-shaped magnetic core having two portions which when placed together define an opening, with one end of the one portion magnetically joined to one end of the other portion, and a magnetic gap between the other end of said one portion and the other end of said other portion, a winding wound on one of said core portions, said winding having a thin layer of non-magnetic material covering said winding, and a support plate having a flat surface on which said D-shaped core is supported, said support plate being a laminated structure having a magnetic sheet and non-magnetic sheets on opposite sides thereof, said plurality of elementary head units being stacked with the gaps of said elementary head units aligned in a single straight line, said non-magnetic sheets each having at least one recess therein across which the portion of said core having said winding thereon extends, said recesses being aligned, the winding extending into said recess and bending said magnetic sheet into the recess in the non-magnetic sheet which is on the opposite side of said head unit from said D-shaped core.

7. A multi-channel magnetic head as claimed in claim 6, wherein a winding from an adjacent head unit in said stack extends into said recess in a support plate and bends said magnetic sheet into the recess in the non-magnetic sheet which is on the same side of said head unit as said D-shaped core.

* * * * *